United States Patent
Adams et al.

(10) Patent No.: US 7,779,873 B2
(45) Date of Patent: *Aug. 24, 2010

(54) METHOD AND APPARATUS FOR FILLING A FUEL CONTAINER

(75) Inventors: Paul Adams, Monroe, CT (US);
Andrew J. Curello, Hamden, CT (US)

(73) Assignee: Societe BIC (FR)

( * ) Notice: Subject to any disclaimer, the term of this patent is extended or adjusted under 35 U.S.C. 154(b) by 949 days.

This patent is subject to a terminal disclaimer.

(21) Appl. No.: 11/558,751

(22) Filed: Nov. 10, 2006

(65) Prior Publication Data

US 2007/0065706 A1 Mar. 22, 2007

Related U.S. Application Data

(63) Continuation-in-part of application No. 10/725,264, filed on Dec. 1, 2003, now Pat. No. 7,156,131.

(51) Int. Cl.
*B65B 1/04* (2006.01)

(52) U.S. Cl. .......................... 141/98; 141/302; 141/351

(58) Field of Classification Search ................. 141/301, 141/302, 67, 95, 198, 351–354, 383; 137/614.04
See application file for complete search history.

(56) References Cited

U.S. PATENT DOCUMENTS

| | | | |
|---|---|---|---|
| 6,610,433 B1 | 8/2003 | Herdeg et al. | |
| 7,156,131 B2 * | 1/2007 | Adams et al. | 141/98 |
| 7,482,091 B2 | 1/2009 | Bourilkov et al. | |
| 2003/0162070 A1 | 8/2003 | Hirsch et al. | |
| 2003/0198846 A1 | 10/2003 | Franklin | |
| 2004/0265671 A1 | 12/2004 | Chipchase et al. | |
| 2006/0260715 A1 | 11/2006 | Muller et al. | |

OTHER PUBLICATIONS

European Office Action issued in connection with corresponding European Patent Application on Feb. 25, 2010.

* cited by examiner

*Primary Examiner*—Steven O Douglas
(74) *Attorney, Agent, or Firm*—The H.T. Than Law Group (57) ABSTRACT

A filling device for use to manually or automatically refill a fuel cartridge using a separate fuel container or a second fuel cartridge is disclosed. The filling device provides for the sharing or fuel among numerous fuel containers and fuel cartridges in various consumer electronic devices. Fuel cartridges can be filled in-situ using an adapter for connecting the fuel container to the fuel cartridge. The adapter includes an input connector and an output connector arranged to adapt various fuel containers and fuel cartridges together. The adapter can be arranged as a passive device or as an active device and can include pumps, valves, power sources and control units as desired.

11 Claims, 6 Drawing Sheets

METHOD AND APPARATUS FOR FILLING A FUEL CONTAINER

CROSS-REFERENCE TO RELATED APPLICATIONS

The present application is a continuation of co-pending, commonly-owned U.S. patent application Ser. No. 10/725,264, which was filed on Dec. 1, 2003.

FIELD OF THE INVENTION

This invention generally relates to fuel containers for fuel cells, and more particularly this invention relates to refillable fuel cartridges.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely, fuel cells utilizing compressed hydrogen ($H_2$) as fuel; proton exchange membrane (PEM) fuel cells that use methanol ($CH_3OH$), sodium borohydride ($NaBH_4$), hydrocarbons (such as butane) or other fuels reformed into hydrogen fuel; and PEM fuel cells that use methanol ($CH_3OH$) fuel directly ("direct methanol fuel cells" or DMFC). Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MEA). The MEA typically includes a cathode, a PEM and an anode. During operation, the water/methanol liquid fuel mixture is supplied directly to the anode and the oxidant is supplied to the cathode. The chemical-electrical reaction at each electrode and the overall reaction for a direct methanol fuel cell are described as follows:

Reaction at the Anode:

$$CH_3OH + H_2O \rightarrow CO_2 + 6H^+ + 6e^-$$

Reaction at the Cathode:

$$O_2 + 4H^+ + 4e^- \rightarrow 2H_2O$$

The Overall Fuel Cell Reaction:

$$CH_3OH + 1.5O_2 \rightarrow CO_2 + 2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants, laptop computers, and power tools, among others. DMFC is discussed in U.S. Pat. Nos. 5,992,008 and 5,945,231, which are incorporated by reference in their entireties. Generally, the PEM is made from a polymer, such as Nafion™, available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The cell reaction for a sodium borohydride reformer fuel cell is as follows:

$$NaBH_4 \text{ (aqueous)} + 2H_2O \rightarrow \text{(heat or catalyst)} \rightarrow 4(H_2) + (NaBO_2) \text{ (aqueous)}$$

$$H_2 \rightarrow 2H^+ + 2e^- \text{ (at the anode)}$$

$$2(2H^+ + 2e^-) + O_2 \rightarrow 2H_2O \text{ (at the cathode)}$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in U.S. published patent application no. 2003/0082427, which is incorporated herein by reference.

One of the important features for fuel cell applications is fuel storage. Another important feature is the regulation of the transport of fuel out of the fuel cartridge to the MEA. To be commercially useful, fuel cells such as DMFC systems should have the capability of storing sufficient fuel to satisfy a consumer's normal usage. For example, for mobile or cell phones, for notebook computers, and for personal digital assistants (PDAs), fuel cells need to power these devices for at least as long as the current batteries, and preferably much longer. Additionally, fuel cells should have easily replaceable or refillable fuel supplies to minimize or obviate the need for lengthy recharges required by the current rechargeable batteries.

Suitable fuel supplies can be either disposable cartridges or refillable cartridges. For the disposable cartridges, the consumer must carry a sufficient supply of spare fuel cartridges for each electronic device. Absent a correct spare cartridge, fuel cannot be supplied to the fuel cell. In addition, once these fuel cartridges are empty, they cannot be refilled and are simply discarded.

Refillable fuel cartridges alleviate having to discard empty cartridges. However, it is desirable to be able to refill these fuel cartridges in a simple and efficient manner, and to be able to refill the empty cartridges in-situ without having to remove them from the electronic device. Additionally, it is desirable to provide a system for transferring fuel from the fuel cartridge in one electronic device to the fuel cartridge or to an internal fuel chamber in a second electronic device. Therefore, fuel can be shared among various electronic devices. Suitable fuel filling and transfer systems would be arranged to handle a wide variety of fuel cartridges.

SUMMARY OF THE INVENTION

The present invention is directed to a filling system or filling device for transferring fuel from one fuel supply to another fuel supply, or from a fuel supply directly into an internal chamber or cartridge disposed in the electronic device. The fuel supply can be a stand-alone fuel container, another fuel cartridge or internal fuel chamber disposed within another electronic device, or an unused fuel cartridge.

In one embodiment, the filling system includes a first fuel chamber arranged to supply fuel to a first fuel cell disposed in a first electronic device through a first fuel connector. The filling system further includes a second electronic device having a second fuel cell and a second fuel chamber. A second fuel connector is attached to the second fuel chamber and is arranged to connect to the first fuel connector to facilitate the transfer of fuel from the first fuel chamber to the second fuel chamber. The fuel connectors are preferably valve connectors, so that the fuel connectors provide a seal to the fuel supply, fuel cartridges or chambers when they are unconnected.

In another embodiment, the filling device includes an adapter for connecting a fuel supply to a refillable fuel cartridge or a fuel chamber. The adapter includes an input connector to connect the adapter to the fuel supply and an output connector to connect the adapter to the fuel cartridge or chamber. The adapter can be arranged as a passive device for use with pressurized fuel supplies and gravity feed systems, or as an active device using a pump and valve system.

In an active system, the adapter includes at least one pump in communication with the input and output connectors. The pump is arranged to transfer fuel from the fuel supply to the refillable fuel cartridge or chamber. The pump can be a manual/mechanical pump or electric pump. In addition, the adapter can include one or more valves between the connectors to selectively stop or regulate the flow of fuel from the fuel supply to the fuel cartridge or chamber. In addition to internal valves, both the input and output connectors can be one half of a two-component valve system. The corresponding second halves of the two-component valve system are attached to the fuel supply and fuel refillable cartridge or chamber.

The filling device also may include the necessary power sources and controllers to control the operation of the adapter and to run the pumps and valves. These power sources and controllers can be located in the first electronic device, the second electronic device or the adapter. All of these components can be in communication with each other through electrical contacts. The filling device can also include a fuel monitoring system to provide for adequate and proper filling of the fuel chamber. The entire system can be arranged to be operated manually or automatically, and the status of the system can be indicated on a display mounted to the adapter, electric device or cartridge.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

The present invention is directed to a system for use in filling or re-filling fuel supplies and can be used with a wide variety of fuel cartridges storing fuel cell fuels including methanol and water, methanol/water mixture, methanol/water mixtures of varying concentrations and pure methanol. These fuel cartridges can also contain other types of fuel cell fuels, for example ethanol, or other chemicals that may improve the performance or efficiency of fuel cells. Suitable fuel cartridges are disclosed and described in co-pending, U.S. Patent Appl. Pub. No. 2004/0151962 A1 entitled "Fuel Cartridge for Fuel Cells," published on Aug. 5, 2004, and in co-pending, commonly owned, U.S. Patent Appl. Pub. No. 2005/0023236 A1 entitled "Fuel Cartridge with Flexible Liner," published on Feb. 3, 2005. US 2004/0151962 and US 2005/0023236 publications are incorporated herein by reference in their entireties.

The term "fuel" as used herein includes all fuels that can be reacted in fuel cells, and includes all of the above listed suitable fuels, liquids, chemicals and mixtures thereof. The fuel cartridge may contain other types of fuel cell fuels, such as ethanol or other alcohols, chemicals that can be reformatted into hydrogen, or other chemicals that may improve the performance or efficiency of fuel cells. Suitable fuels also include potassium hydroxide (KOH) electrolytic solution, which is usable with metal fuel cells or alkali fuel cells, and can be stored in fuel cartridges. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or More Loads," published on Apr. 24, 2003, which is incorporated herein by reference in its entirety.

Fuels also include a mixture of methanol, hydrogen peroxide and sulfuric acid, which flows past a catalyst formed on silicon chips to create the fuel cell reaction. Additional fuels include the aqueous sodium borohydride ($NaBH_4$) and water discussed above. Fuels further include hydrocarbon fuels, disclosed in United States published patent application no. 2003/0096150, entitled "Liquid Hereto-Interface Fuel Cell Device," published on May 22, 2003, which is incorporated herein by reference in its entirety. The present invention is, therefore, not limited to any particular arrangement of fuel cartridge or to any particular type of fuels or liquids contained in the cartridge.

Unless otherwise noted, as used herein, the term "fuel supply" includes, but is not limited to cartridge, fuel cartridge, fuel container, fuel tanks, fuel reservoir, fuel refilling tank, fuel chamber including refillable fuel chamber disposed inside the electronic device and other containers that store fuel. "Fuel supply" also includes those with single or multiple internal compartments and further includes those that contain one or more fuels. "Fuel supply" may be large or small and may have multiple fluid connections. The term "cartridge" or "fuel cartridge" include, but are not limited to, cartridge, fuel cartridge, disposable cartridges, refillable/reusable cartridges, cartridges that reside inside an electronic device, cartridges that reside outside of the electronic devices. "Fuel chamber" includes "cartridge" or "fuel cartridge" and any internal chamber including refillable chamber inside a device adapted to store fuel.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist, (December 2001/January 2002) at pp. 20-25. Other applications include storing traditional fuels for internal combustion engines, and hydrocarbons, such as butane for pocket and utility lighters and liquid propane.

Figure 1:
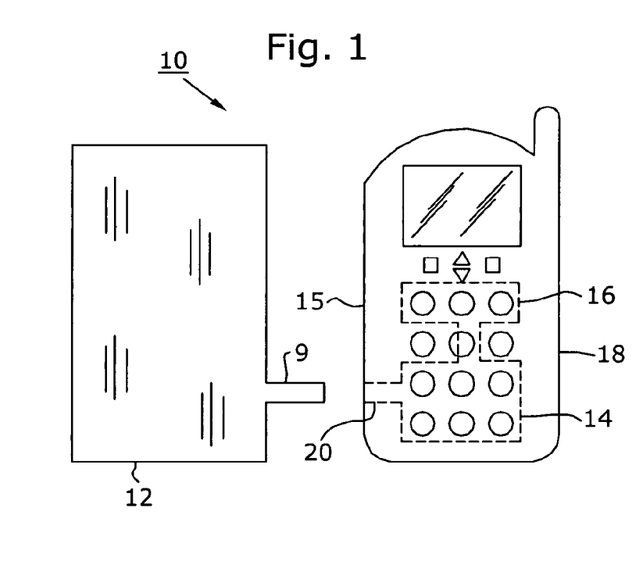
FIG. 1 is a plan view of an embodiment of the filling system in accordance with the present invention.
Figure 2:
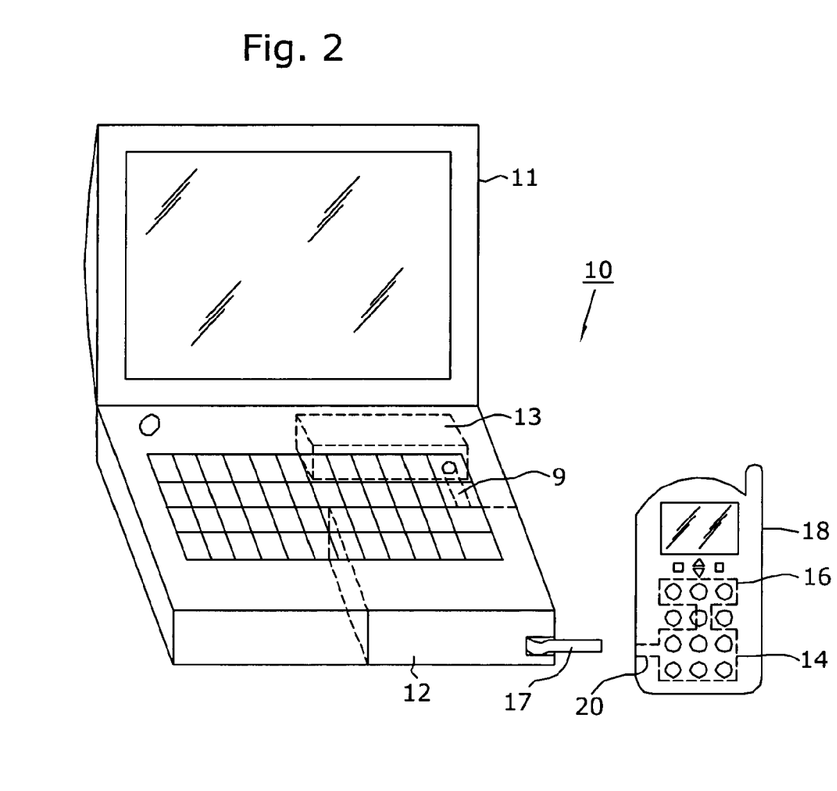
FIG. 2 is a perspective view of another embodiment of the filling system.

Referring initially to FIGS. 1 and 2, the present invention is directed to filling system 10 that includes first fuel supply 12 arranged to supply fuel to first fuel cell 13 disposed in first electronic device 11. Although fuel supply 12 is illustrated as fuel cartridge 12 in FIG. 2 and is referred hereinafter as fuel cartridge 12, any fuel supply arranged to hold or store fuel cell fuel can be used. First fuel cartridge 12 can be a pressurized or a non-pressurized container. In order to supply first fuel cell 13 with fuel, first fuel cartridge 12 includes first fuel cartridge connector 9. First electronic device 11 can be any consumer electronic device capable of being arranged to receive power from first fuel cell 13. Examples of suitable consumer electronic devices include, but are not limited to, laptop or hand-held computers, cellular phones, personal digital assistants (PDA's), text messaging systems, power tools, portable tape/radio/compact disc players, flashlights, clocks and electronic toys.

Preferably, first electronic device 11 is selected such that first fuel cartridge 12 has a relatively large capacity, for example a laptop computer in which first fuel cartridge 12 can have a size comparable to conventional laptop batteries. Therefore, electronic devices having relatively large fuel cartridges, for example the laptop computer, can be used to re-fill smaller fuel cartridges, and small cartridges could be emptied into a larger cartridge for transportation, recycling or other environmental reasons. This arrangement also obviates the need to carry a separate container specifically for holding spare fuel, since the fuel cartridges can be used directly with a fuel cell or as a spare fuel supply. First fuel cartridge 12 can be removed or be fixed within first electronic device 11.

Filling system 10 also includes second electronic device 18 arranged to receive power from second fuel cell 16 disposed therein. Suitable second electronic devices 18 are the same as for first electronic device 11. Second electronic device 18 includes internal, refillable fuel chamber 14 in fluid communication with second fuel cell 16 to deliver fuel thereto. Therefore, fuel cell 16 supplies the necessary power to electronic device 18 using fuel supplied by fuel chamber 14.

Preferably, second electronic device 18 is selected such that internal fuel chamber 14 has a smaller volume than first fuel cartridge 12.

In one embodiment, internal fuel chamber 14 is a second fuel cartridge. The second fuel cartridge is refillable and can be removed from second electronic device 18 or be fixed in place and refilled with a refilling valve exposed to the outside of the electronic device. Typically, empty fuel cartridges are removed from the electronic device and replaced with new fuel cartridges. In accordance with the present invention, the second fuel cartridge is refilled and not discarded. In one embodiment, the second fuel cartridge is removed from electronic device 18 and refilled with fuel. Following refilling, the second fuel cartridge is reinserted into electronic device 18.

In accordance to another aspect of the present invention, fuel chamber 14 is refilled in-situ, i.e., refilling without removing from the electronic device. In order to facilitate in-situ refilling, fuel chamber 14 includes fuel chamber connector or re-filling connector 20. Fuel chamber connector 20 extends from fuel chamber 14, can be arranged as either a female connector or a male connector and is arranged to be accessible through electronic device 18. This access can be provided through a hole or port in electronic device 18 that exposes refilling connection 20. Preferably, fuel chamber connector 20 is arranged to be flush with exterior surface 15 of second electronic device 18. In one embodiment as shown in FIG. 1, fuel chamber connector 20 is arranged to connect to first fuel cartridge connector 9 to facilitate the transfer of fuel from first fuel cartridge 12 to fuel chamber 14 in-situ. In this embodiment, first fuel cartridge 12 is removed from first electronic device 11 before being connected to second electronic device 18. Therefore, first fuel cartridge connector 9 is used as a fuel supply to first fuel cell 13 and to re-fill fuel chamber 14.

Generally, fuel cartridge 12 can be a fuel supply adapted to power electronic devices and to refill other fuel cartridges and fuel chambers, or adapted only to refill fuel cartridges and chambers. Additionally, one or more smaller fuel supplies can be used to refill a larger fuel cartridge or chamber.

As illustrated, first fuel cartridge connector 9 is a male connector, and fuel chamber connector 20 is a female connector. Fuel flow is either by gravity or under pressure from first fuel cartridge 12 to internal fuel chamber 14. Pressure can be supplied by hand squeezing the first cartridge, when the outer casing of the cartridge is relatively flexible. To prevent undesired leakage of fuel from either first fuel cartridge 12 or internal fuel chamber 14, before first fuel cartridge connector 9 and fuel chamber connector 20 are brought into proper contact, check valves, manual or spring-loaded closures, or other seals can be provided in both first fuel cartridge connector 9 and fuel chamber connector 20. Therefore, fuel flow from first fuel cartridge 12 to internal fuel chamber 14 is not established until first fuel cartridge connector 9 is brought into contact with fuel chamber connector 20. Such valves, valve components, seals and closures are disclosed in co-pending, commonly owned U.S. Patent Appl. Pub. No. 2005/0022882 entitled "Fuel Cartridge with Connecting Valve," published on Feb. 3, 2005 and incorporated herein by reference in its entirety. Optionally, the valve connection can be confirmed electronically to ensure that the valves or valve components are properly connected before fuel flow is initiated.

As shown in FIG. 2, in another embodiment, first fuel cartridge 12 can be used to re-fill internal chamber 14 without removing first fuel cartridge 12 from first electronic device 11. In this embodiment, first fuel cartridge 12 further includes second connector 17. As with first fuel cartridge connector 9, second connector 17 is arranged to connect to fuel chamber connector 20 and can be either a male connector or a female connector.

Figure 3:
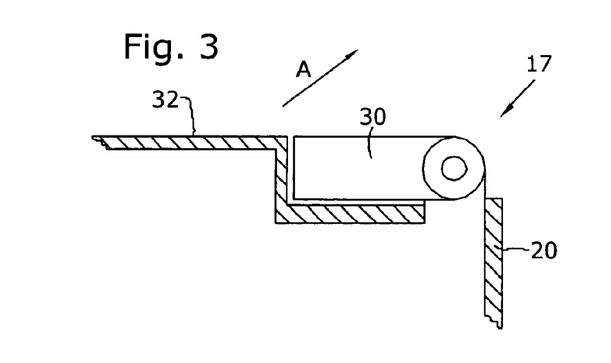
FIG. 3 is a schematic representation of an embodiment of a retractable connector in a retracted position for use in the filling system.
Figure 4:
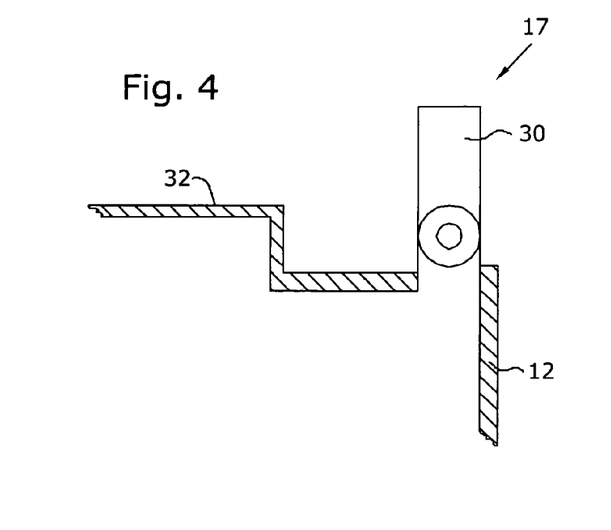
FIG. 4 is a schematic representation of the retractable connector in an extended position.

It is desirable from the standpoint of both functionality and aesthetics not to have connectors protruding from either first fuel cartridge 12 or second electronic device 18. In one embodiment, first fuel cartridge connector 9, second connector 17 or fuel chamber connector 20 can be arranged as retractable connector 30. As illustrated in FIGS. 3 and 4 for second connector 17, retractable connector 30 is in a retracted position such that it is flush with edge 32 of fuel cartridge 12. By rotating retractable connector 30 in the direction of arrow A, retractable connector 30 is moved to an extended position as shown in FIG. 4. Retractable connector 30 can also be constructed so that its internal passage is open in the extended position and closed in the retracted position, providing a seal or acting like a valve for second connector 17. Although illustrated as a rotating structure, retractable connector 30 can be any structure that provides for retraction to a position flush with edge 32 including sliding, folding and telescoping structures.

First fuel cartridge connector 9, second connector 17 and fuel chamber connector 20 can be arranged as mating, two-component valve systems, as disclosed in US 2005/0022883 previously incorporated by reference. Each valve component is capable of providing a seal. In one embodiment, first fuel cartridge connector 9 or second connector 17 is one half of a two-component valve, and fuel chamber connector 20 is the complementary half of the two-component valve. In addition to providing for connectivity and fluid communication between first fuel cartridge 12 and internal chamber 14, these valve halves seal first fuel cartridge 12 and internal fuel chamber 14 when not connected together. Suitable two-component valves are fully disclosed in US 2005/0022883, discussed above. These two-component valves can be uniquely arranged so that only specific halves fit together. This uniqueness can be used to provide a method to ensure that the proper fuel cartridges are matched to the internal fuel containers. Alternatively, the valve halves can be universal, mix-and-match type fittings.

Figure 5:
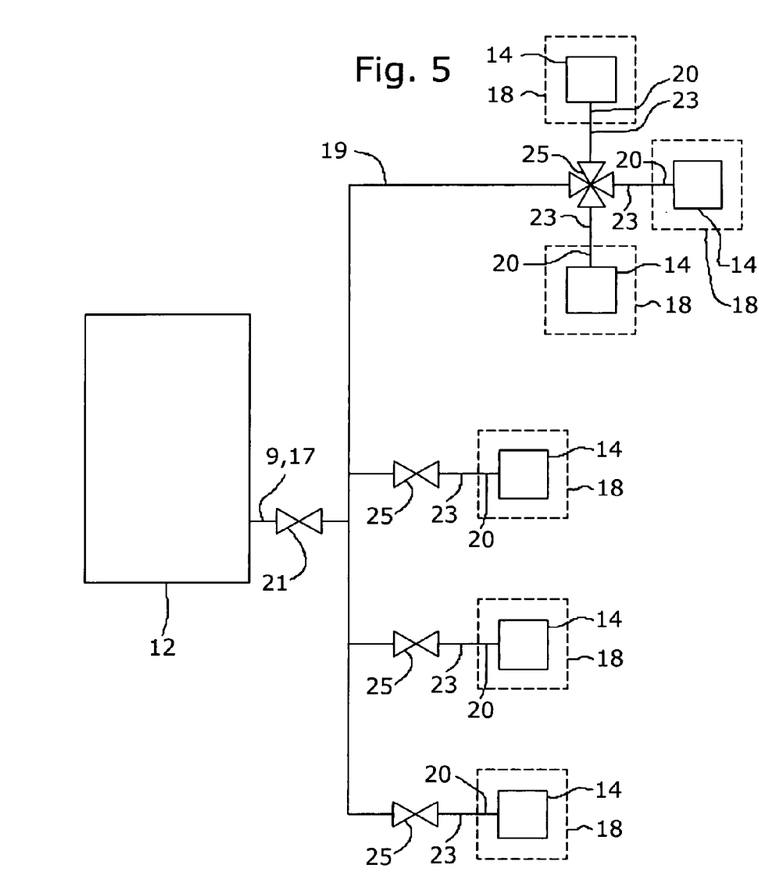
FIG. 5 is a schematic representation of an embodiment of a manifold for use with the filling system.

First fuel cartridge 12 can be used to re-fill more than one cartridge or internal fuel chamber 14. Preferably, first fuel cartridge 12 can be used to simultaneously fill a plurality of cartridges or internal fuel chambers 14 disposed in a plurality of second electronic devices 18. As illustrated in FIG. 5, manifold 19 is provided to connect first fuel cartridge 12 to the plurality of internal chambers 14. Manifold 19 includes at least one manifold input 21 arranged to connect to first fuel cartridge connector 9 or second connector 17 and a plurality of manifold outputs 23 arranged to connect to one of the plurality of fuel chamber connectors 20. Suitable connections for manifold input 21 and manifold outputs 23 are the same as for first fuel cartridge connector 9, second connector 17 and fuel chamber connector 20, discussed above. In general, any type of connection capable of providing a sufficient attachment and seal between first fuel cartridge 12, manifold 19 and fuel chambers 14 can be used including press fit connections, threaded connections, union fittings and the like. In one example, first fuel cartridge 12 is a relatively large fuel supply which is connected to manifold input 21, and a plurality of electronic devices are connected to manifold outputs 23 to be refilled or the fuel supply has multiple valves which can be connected to multiple devices.

The inputs and outputs of manifold 19 are connected together using any suitable fixtures including micro-channel type tubing. These fixtures can be flexible type fittings or rigid fittings. In order to control the flow through manifold 19 to and among fuel chambers 14, manifold 19 includes at least one and preferably a plurality of valves 25. These valves can provide simple on and off functionality or can control or limit the flow of fuel. Suitable valves include ball valves, needle valves, three-way and four-way valves, gate valves, butterfly valves, rotary valves and check valves.

Figure 6:
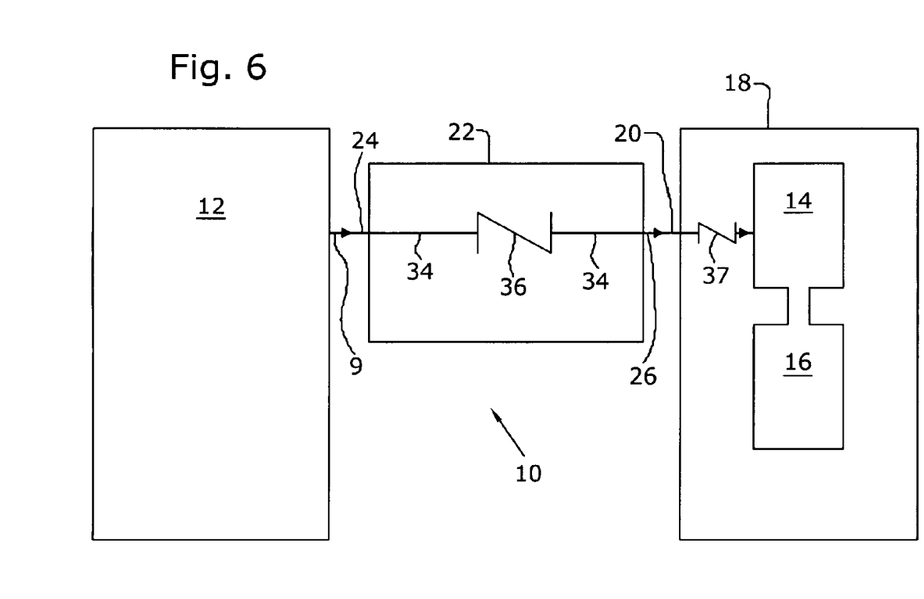
FIG. 6 is a schematic representation of another embodiment of the filling system including an adapter.

Referring to FIG. 6, in one embodiment filling system 10 includes adapter 22 that provides an interface between fuel cartridge 12 and fuel chamber 14, and facilitates the transfer of fuel from fuel cartridge 12 to fuel chamber 14. Adapter 22 includes at least one input connector 24 to connect adapter 22 to fuel cartridge 12, and at least one output connector 26 to connect adapter 22 to fuel chamber 14. Input connector 24 is in fluid communication with output connector 26 through adapter 22. Various arrangements for input connector 24 and output connector 26 are possible and these connectors can either be the same type of connector or different types of connectors. Any type of connection capable of providing a sufficient attachment and seal with either fuel cartridge 12 or fuel chamber 14 can be used including press fit connections, threaded connections, union fittings and the like. Valve components disclosed in US 2005/0022883 are also usable in this embodiment.

Figure 7:
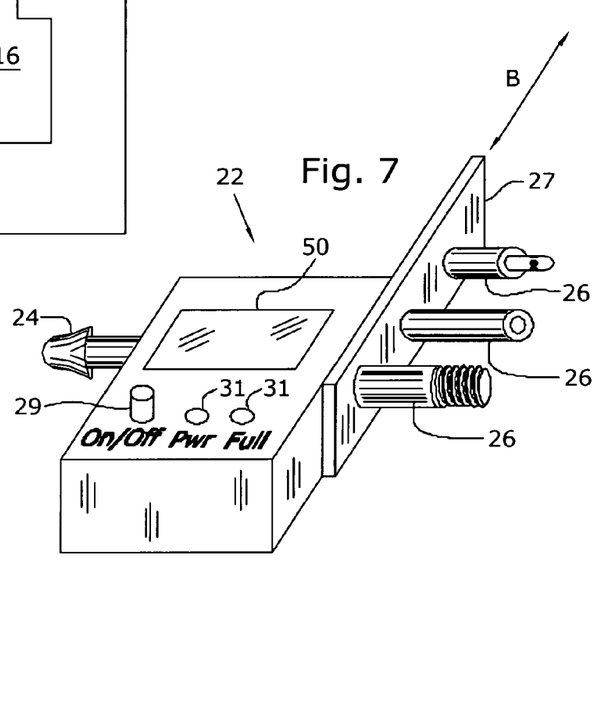
FIG. 7 is a plan view of another embodiment of the adapter for use in the filling system.

In one embodiment, input and output connectors 24, 26 are arranged to fit specific types of fuel containers and refillable fuel cartridges, ensuring proper matching of fuel containers and fuel cartridges. In another embodiment, either one or both of input or output connectors 24, 26 are arranged as universal fittings, capable of connecting to numerous types of fuel containers and fuel cartridges. For example, either one or both of input and output connectors 24 and 26 can each include a plurality of different types of connectors arranged to be selected by the users. For example, the plurality of output connectors 26 can be disposed on a rotatable or slideable rack 27 as illustrated in FIG. 7. Slideable rack 27 is then moved back and forth in the direction of arrow B until desired output connector 26 is in fluid alignment with input connector 24. Similar selectivity among a plurality of inputs and outputs can also be provided using a plurality of valves internal to adapter 22.

Input and output connectors 24, 26 can be either male connectors or female connectors. In one embodiment, both input connector 24 and output connector 26 are male connectors that engage complimentary female connectors in first fuel cartridge 12 and fuel chamber 14 respectively. As with first fuel cartridge connector 9, second connector 17 and fuel chamber connector 20, these male connectors can be arranged as retractable connections. This embodiment eliminates extensions or protrusions from adapter 22 that can undesirably snag clothing or furniture. Additionally, a separate valve connector, which includes male and/or female connectors having different sizes, may be provided as an intermediate member to connect input connectors to output connectors.

In another embodiment, input connector 24 is one half of a two-component valve, and fuel cartridge 12 contains the other mating half of the two-component valve. In addition to providing for connectivity and fluid communication between fuel cartridge 12 and adapter 22, these valve halves seal fuel cartridge 12 and adapter 22 when not connected together. Suitable two-component valves are fully disclosed in US 2005/0022883, discussed above. In addition to this first two-component valve between fuel cartridge 12 and adapter 22, a second similar two-component valve can be placed between adapter 22 and fuel chamber 14. Output connector 26 is one half of the two-component valve, and connector 20 of fuel chamber 14 is the other complimentary half of the two-component valve. These valve halves can be connected to adapter 22, fuel container 14 and fuel cartridge 12 by any suitable method including press-fitting, pipe threads, adhesives and welds. In one embodiment, these two-component valves are uniquely arranged so that only specific halves fit together. This embodiment can be used to provide a method to ensure that the proper fuel containers are matched to the proper fuel cartridges. Alternatively, the valves halves are universal, mix-and-match type fittings.

Adapter 22 can be a passive device or an active device. In one embodiment, adapter 22 is arranged as a passive device. This arrangement is suitable when used with pressurized fuel containers or when gravity feed is the preferred method of transferring fuel to fuel chamber 14. When adapter 22 is passive, input connector 24 and output connector 26 are in direct fluid connection through micro-channel sized piping 34 (FIG. 6) that passes through adapter 22. In order to provide for the ability to control or stop the flow of fuel through adapter 22, adapter 22 can include one or more valves 36 disposed between input connector 24 and output connector 26. Valves 36 can be arranged to simply provide an on-off function or can be arranged to restrict and control the flow and pressure of fluid through adapter 22. Suitable valves include ball valves, needle valves, three-way and four-way valves, gate valves, butterfly valves, rotary valves and check valves. In addition, valves 36 can be used alone or in combination with the two-component valves in the input and output connectors. In one embodiment, internal fuel chamber connector 20 includes check valve 37 to prevent the back-flow of fuel from internal chamber 14 when chamber connector 20 is disengaged from adapter 22. Internal fuel chamber connector 20 or other valves, valve components or other connectors may also include a filler material to control the flow of fuel. Such filler materials are disclosed in US 2004/0151962 that was previously incorporated by reference.

Figure 8:
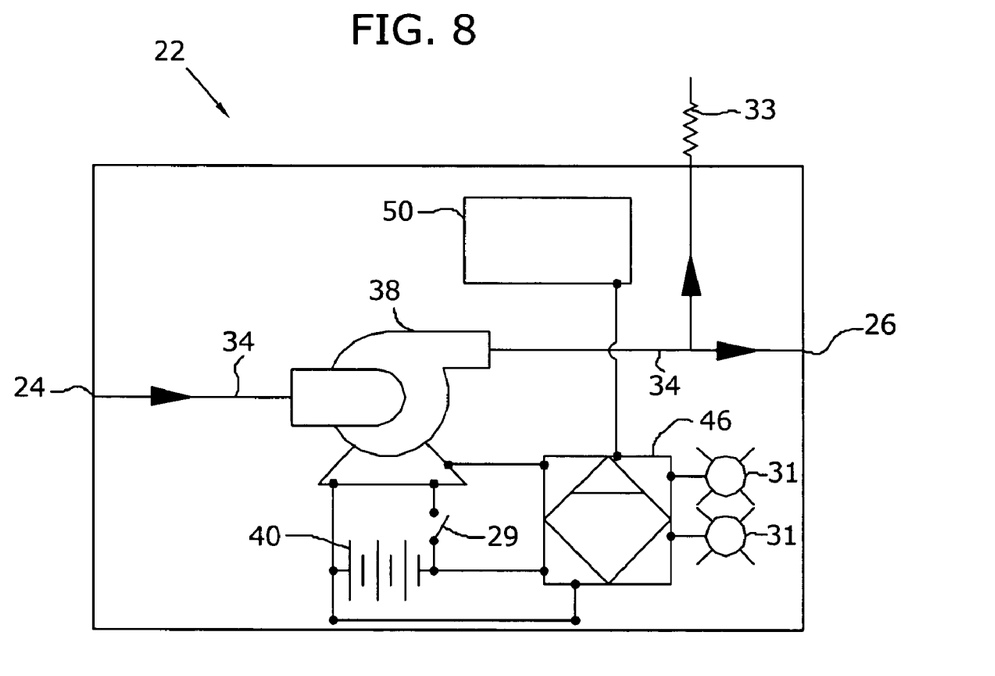
FIG. 8 is a schematic representation of another embodiment of the adapter for use in the filling system.

As is illustrated in FIG. 8, adapter 22 can be arranged as an active device and can include one or more pumps 38 disposed in piping 34 and in communication with input and output connectors 24, 26 to transfer fuel from fuel cartridge 12 to fuel chamber 14. Preferably, pump 38 is adapted for use with liquid flow rates and is available in small sizes. Pump 38 can be a manual pump or an electronic pump. Suitable manual pumps include blister or bladder type pumps that can be activated by hand pressure, and other manual hand pumps.

In one embodiment, pump 38 is an electric or electronic pump. Preferably, pump 38 has a minimal number of moving parts to minimize breakage. Suitable pumps include micro-electromechanical systems (MEMS) pumps, such as those used to pump ink in ink-jet printers, to meter drugs in drug delivery systems or to cool micro integrated circuit chips. In particular, suitable MEMS pumps include field-induced flow pumps and membrane-displacement pumps. Field induced pumps utilize an electric or magnetic field to produce fluid flow.

A suitable field-induced pump is an electro-osmotic pump. Electro-osmotic pumps contain no moving parts and are capable of moving fluids through tight spaces. Electro-osmotic pumps advantageously can move fluid with low conductivity. An electro-osmotic flow is created when a DC potential is applied across a porous media. The liquid in the porous media is driven from the anode or positive electrode to the cathode or negative electrode, when exposed to the DC electrical field. Electro-osmotic pumps are particularly useful in micro-channels, such as those within adapter 22. Electro-osmotic flow is discussed in detail in U.S. Pat. No. 3,923,426 entitled, "Electroosmotic Pump and Fluid Dispenser Including Same," issued on Dec. 2, 1975, in "Electroosmotic flow pumps with polymer frits" by S. Zeng, C. Chen, J. Santiago, J. Chen, R. Zare, J. Tripp, F. Svec and J. Frechet, published in Sensors and Actuators B Chemical Journal, vol. 82, pp. 209-212 (2002), and in "A Large Flowrate Electroosmotic Pump with Micron Pores," by S. Yao, D. Huber, J. Mikkelsen and J. Santiago, proceedings of IMECE, 2001 ASME International Mechanical Engineering Congress and Exposition, Nov. 11-16, 2001, New York, N.Y., among other references. These references are incorporated by reference herein in their entireties.

Other suitable field-induced pumps include, but are not limited to, electrohydrodynamic pumps and magnetohydrodynamic pumps. Membrane-displacement pumps utilize a force, e.g., an electrical charge, applied to a membrane, causing the membrane to move or vibrate to propel the fluid. Suitable membrane-displacement pumps include, but are not limited to piezoelectric pumps, electrostatic pumps and thermopneumatic pumps.

Suitable piezoelectric pumps usable in adapter 22 include those available from PAR Technologies, LLC of Newport News, Va. Piezoelectric pumps have no moving parts and are lightweight, compact, rugged, quiet and efficient. These pumps have excitation voltages of greater than about 50 V and current draw, for example from as low as about 15 milliamps up to about 130 milliamps at an input voltage from about 2.2 VDC up to about 12 VDC. The flow rate for piezoelectric pumps is from about 10 ml/hour up to about 900 ml/hour at pressures in the range of about 0 to about 5 psi. The size of the pump is from about 0.5 inch up to about 1.5 inch.sup.2 by less than about 0.5 inches thick. The piezoelectric pump is constructed from materials that are compatible with the fuels to be used with fuel cells and fuel cartridges. These pumps also operate in a wide range and have long cycle life.

In order to provide the necessary power to drive pump 38, adapter 22 includes at least one power source 40 electrically connected to pump 38. Any power source capable of providing sufficient power to operate pump 38 and any other electrical or electronic system contained in adapter 22 can be used. Suitable power sources 40 include batteries, fuel cells and solar cells or panels. Power source 40 can be located internal to adapter 22, external to adapter 22 or both. As illustrated in FIG. 8, power source 40 is a battery contained within adapter 22.

Figure 9:
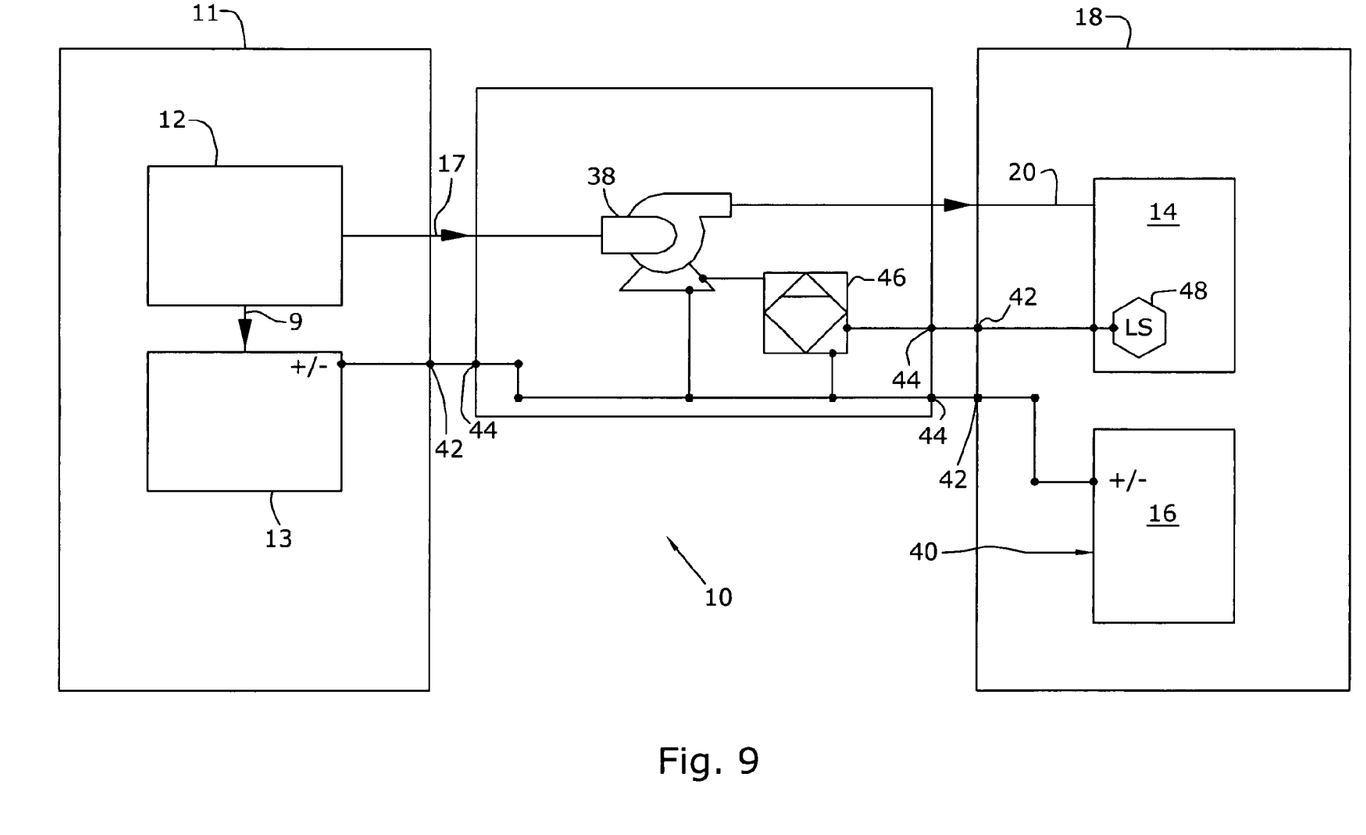
FIG. 9 is a schematic representation of another embodiment of the filling system.

In one embodiment as shown in FIG. 9, power source 40 is disposed in at least one of first electronic device 11 and second electronic device 18. If adapter 22 is connected to a fuel container, then power source can be contained within this fuel container. Preferably, when contained in first electronic device 11, electronic device 18 or a fuel container, power source 40 is a fuel cell or battery, such as fuel cells 13 and 16. As illustrated power source is either first fuel cell 13 or second fuel cell 16.

When power source 40 is located external to adapter 22, electrical connectors are needed to connect the power leads from the external power source to the necessary components within adapter 22. In one embodiment, at least one of fuel cartridge 12, first electronic device 11, first fuel cell 13, second electronic device 18, fuel chamber 14 and second fuel cell 16 includes a first set of electrical connectors 42, and adapter 22 contains a second set of electrical connectors 44 in contact with the first set of electrical connectors 42. These electrical connectors provide sufficient electrical connectivity among the various components of filling system 10 and supply power from power supply 40 to adapter 22. Any type of electrical connector known and available in the art can be used. For example, first and second sets of electrical connectors 42, 44 can be arranged as a series of metal plates or surfaces that align and come into contact when input and output connectors 24, 26 are brought into contact with fuel cartridge 12 and fuel chamber 14. In addition to supplying electric power, first and second set of electrical connectors 42, 44 can be used to transfer digital signals and telemetry among the various components of filling system 10.

In one embodiment as shown in FIG. 8, electric pump 38 can be started and stopped manually using electrical switch 29 located in adapter 22 between power source 40 and pump 38. As shown in FIG. 7, electrical switch 29 is accessible to the user of adapter 22 to turn pump 38 on and off. Although switch 29 is illustrated as a hard-wired electrical switch, switch 29 could alternatively be in communication with logic control unit 46 disposed within adapter 22. Logic control unit 46 is connected to pump 38 and any other electronic device located within adapter 22 including electronically controllable valves, lights and displays. Logic control unit 46 can also be in communication with logic control units and other electronic systems located in fuel cartridge 12 and electronic device 18. First and second sets of electrical connectors 42, 44 can provide communication among these devices. Logic control unit 46 can also include the necessary driver and control circuitry for pump 38, or this circuitry can be provided separately. Power is supplied to logic control unit 46 by power source 40. Logic control unit 46 can also be positioned on the fuel cell or on the device that the fuel cell powers, and be in electrical contact with adapter 22 through electrical connectors, such as connectors 42 and 44.

Suitable logic control units include programmable logic controllers, hard-wired logic controllers and electrically erasable programmable read-only memory (EEPROM). Examples of suitable EEPROMs can be found in co-pending and co-owned U.S. Patent Appl. Pub. No. 2005/0118468 entitled "Fuel Cell Supply Including Information Storage Device and Control System" that published on Jun. 2, 2005 and is incorporated herein by reference in its entirety.

Therefore, the logic control unit functions as a controller and store/retrieve information. The programmable logic controllers or hard-wired logic controllers provide the control unit functionality of logic control unit 46. As a controller, logic control unit 46 controls the functions of pump 38, switch 29, lights 31, display 50, valve 39, e.g. a solenoid valve, and fuel gauge 48, among other components. Suitable methods for using logic control unit 46 to control the function of these devices and components are known and available in the art. For example, logic control unit 46 can function as a controller to set the pumping rate of pump 38 or set the opening of a flow regulating valve to control the flow rate.

In one embodiment, the logic control unit 46 stores and retrieves information from an information storage device, such as an EEPROM. In addition, information storage can be provided by random access memory (RAM), read-only memory (ROM), programmable read-only memory (PROM), erasable programmable read-only memory (EPROM), flash memory, electronically readable elements (such as resistors, capacitance, inductors, diodes and transistors), optically readable elements (such as bar codes), magnetically readable elements (such as magnetic strips), integrated circuits (IC chips) and programmable logic arrays (PLA), among others.

EEPROM is a user-modifiable read-only memory that can be erased and rewritten or reprogrammed repeatedly throughout its useful life through the application of higher than normal electrical writing voltage on the same pin among other programming means. EEPROM does not need to be removed from logic control unit 46 or adaptor 22 to be modified. Advantageously, portions of an EEPROM can be write-protected, i.e., information originally written is saved and protected from the writing voltage, while other portions of the EEPROM can be repeatedly rewritten. Additionally, an EEPROM, similar to other ROMs, does not need electrical power to maintain the memory or data stored thereon. Hence, when an electrical device powers up, it relies on the information stored on an EEPROM to start-up and runs its programming. To erase and rewrite an EEPROM, logic control unit 46 directs a predetermined voltage at a particular location of the EEPROM to store new information thereon.

Although illustrated within adaptor 22, logic control unit 46 can be positioned within fuel cartridge 12 or fuel chamber 14, and as discussed above can be in communication with adaptor 22 and the components contained therein through first and second electrical contacts 42,44. In addition, logic control unit 46 can be in communication with an EEPROM or other storage disposed within logic control unit or with information storage devices (not shown) disposed in fuel cartridge 12, fuel chamber 14 or pump 38, among others. Information storage devices associated with pump 38 store relevant permanent and rewritable information concerning pump 38, as discussed above.

Controller 46 may access information stored in the information storage device or memory during the refilling of the fuel chamber 14. The functions of controller or logic control unit 46 vis-à-vis the other components, including a fuel refilling device, are fully described in US 2005/0118468, incorporated above, for example, in paragraphs 21, 23, 25, 26, 90, 102-114, 124-125, among other portions of US 2005/0118468.

In another embodiment of filling device 10 in accordance with the present invention, filling device includes a system for monitoring the amount of fuel in fuel chamber 14 or the amount of fuel that has been transferred from fuel cartridge 12 to fuel chamber 14. The fuel monitoring system can automatically halt the transfer of fuel when the level of fuel reaches a predetermined value by stopping pump 38 or closing valve 36. Suitable values for the level of fuel include up to about 85% to about 95% of the capacity of fuel chamber 14.

Although the fuel monitoring system is preferably arranged to automatically stop the flow of fuel, the system can also provide a notification to the user that fuel chamber 14 is sufficiently full. The user would then stop the transfer of fuel in response to this indication. Notification of the status or operation of adapter 22 can be provided to the user through one or more displays 50 or indicator lights 31 mounted on adapter 22, on the electrical device or on the cartridge to be readily viewable by the user as shown in FIGS. 7 and 8. Suitable displays 50 and indicator lights 31 include light emitting diodes and liquid crystal displays. Display 50 and indicator lights 31 provide visual indication of the various functions and information regarding filling system 10 including "Power On", "Battery Low", "Pump On", "Fuel Level" and "Fuel Cartridge Full" among others. Display 50 and indicator lights 31 are connected to and controlled by logic control unit 46.

This fuel monitoring system is connected to adapter 22 and in one embodiment is completely contained within adapter 22. Suitable systems monitor information such as the back pressure from fuel chamber 14 or the cumulative amount of fuel transferred to determine when a sufficient amount of fuel has been transferred to fuel chamber 14. In this embodiment, the fuel monitoring system includes logic control unit 46. In another embodiment as illustrated in FIG. 9, the fuel monitoring system includes fuel gauge 48, as described below, connected to fuel chamber 14 to measure the amount of remaining fuel in fuel chamber 14. Examples of suitable electronically readable fuel gauges are shown in commonly owned, co-pending U.S. Patent App. Pub. No. 2005/0115312

A1, entitled "Fuel Gauge for Fuel Cartridges" that published on Jun. 2, 2005 and is incorporated herein by reference in its entirety. Fuel gauge 48 can be in contact with logic control unit 46 through the first and second sets of electric contacts 42, 44.

The readable property can be an electrical capacitance between two nodes and wherein the first node is located at a position that moves as fuel is removed from the fuel supply. The first node can be located on a liner containing the fuel and the liner is positioned within the fuel supply. The second node is located on the fuel cell or on the electronic equipment.

The readable property can be a magnetic force between two poles and wherein the first pole is located at a position that moves as fuel is removed from the fuel supply. The first pole can be located on a liner containing the fuel and the liner is positioned within the fuel supply. The second pole is located on the fuel cell or on the electronic equipment.

The readable property can be the resistance of a semi-conducting resistor. Preferably, the semi-conducting resistor is a thermistor. The thermistor is located adjacent to the fuel, and preferably located adjacent to a liner containing the fuel. Alternatively, the thermistor is located within the fuel. The electrical circuit can send an electrical current either intermittently or continuously to the thermistor to gage the amount of remaining fuel.

The readable property can also be the resistance of a bi-metal resistor. Preferably, the bi-metal resistor is a thermocouple. The thermocouple is located adjacent to the fuel, and preferably located adjacent to a liner containing the fuel. Alternatively, the thermocouple is located within the fuel. The electrical circuit can send an electrical current either intermittently or continuously to the thermocouple to gage the amount of remaining fuel.

The readable property can also be an oscillating magnetic field generated by an inductive sensor. A second sensor interferes with the magnetic field causing eddy currents to form. The inductive sensor is preferably located on the fuel cell or the electronic device and the second sensor is spaced apart from the inductive sensor. The distance between the inductive sensor and the second sensor, which correlates to the remaining fuel, is related to the strength of the oscillating magnetic field.

The electrical circuit is located in the fuel cell or in the electronic device. Preferably, the fuel supply is a fuel cartridge. The fuel supply includes disposable cartridges, refillable cartridges, reusable cartridges, cartridges that reside inside the electronic device, cartridges that are outside of the electronic device, fuel tanks, fuel refilling tanks, and fuel containers.

Figure 10:
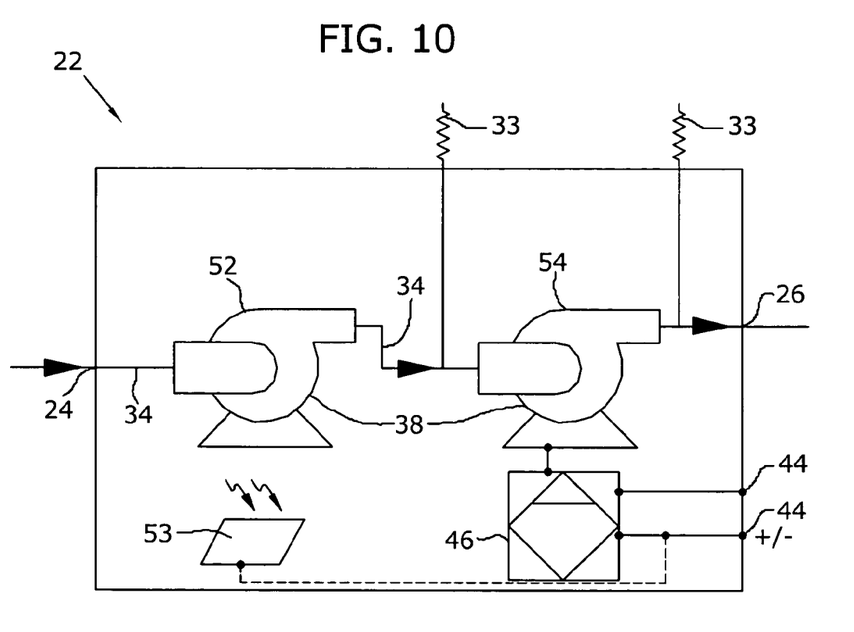
FIG. 10 is a schematic representation of another embodiment of an adapter for use in the filling system.
Figure 11:
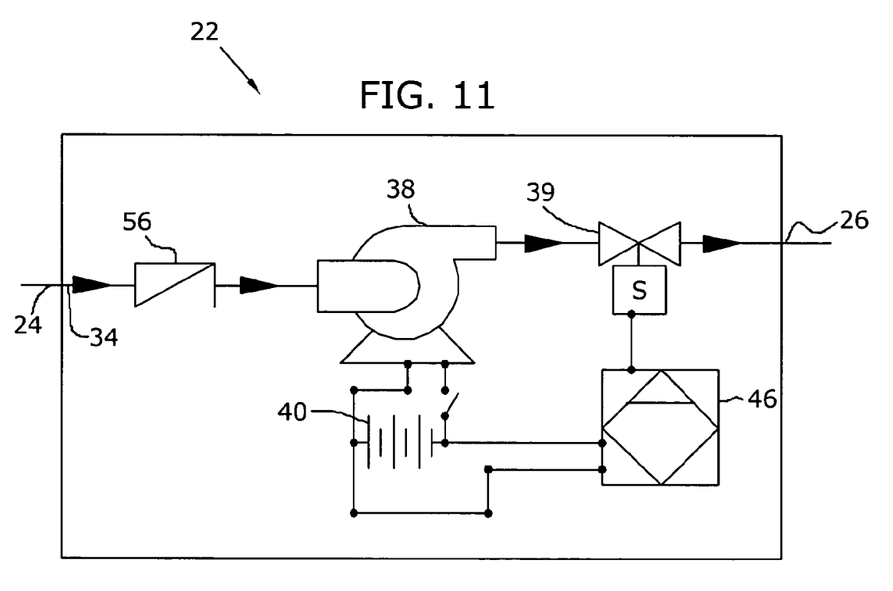
FIG. 11 is a schematic representation of yet another embodiment of an adapter for use in the filling system.

Other embodiments of pumps and valves in adapter 22 in accordance with the present invention are illustrated in FIGS. 10 and 11. As shown in FIG. 10, adapter 22 includes two pumps, first manual pump 52 and second electronic pump 54. Electronic pump 54 is connected to logic control unit 46. Logic control unit 46 receives power from power source 40 external to adapter 22 and fuel level information through contacts 44. Preferably, power source 40 is second fuel cell 16 inside second electronic device 18. Since fuel chamber 14 may be empty, manual pump 52 is used to transfer fuel to fuel chamber 14 until there is sufficient fuel for fuel cell 16 to provide power to logic control unit 46 and electronic pump 54 via electrical contacts 44. At that point, manual pumping can stop and electronic pump 54 can take over. Manual pump 52 and be positioned in series or in parallel with electronic pump 54. Alternatively, manual pump 52 can be replaced by solar cells and panels 53 that can convert natural light and artificial light to electricity to power pump 54. Additionally, manual pump 54 can be replaced by other external power sources such as batteries. To prevent damage to any of the components of filling system 10 that could result from obstructions in micro-channels 34 and from attempted overfilling of fuel chamber 14, one or more pressure relief valves 33 can be provided in communication with micro-channels 34.

In the embodiment illustrated in FIG. 11, pump 38 can be combined with various arrangements of valves and other flow controllers to achieve the desired amount of control in the fuel flow transfer. For example, pump 38 can be in fluid communication with solenoid valve 39 and check valve 56. Pump 38 and solenoid valve 39 are in communication with power supply 40 and logic control unit 46 are necessary to control the operation of adapter 22 and the flow of fuel from fuel cartridge 12 to fuel chamber 14.

In operation, filling system 10 provides a method for in-situ filling of fuel chambers or cartridges disposed within electronic devices that contain fuel cells for providing power the necessary power for the electronic device. In order to re-fill the fuel chamber within the electronic device, a spare fuel container or fuel cartridge containing the proper type of fuel for the fuel cell is selected. Preferably, a fuel cartridge is selected that has a substantially larger volume of fuel than the fuel chamber. For example, the fuel chamber can be disposed in a cellular telephone, and the fuel cartridge is from a laptop computer. The fuel cartridge is then brought into contact and fluid communication with the fuel chamber. Preferably, fluid communication between the cartridge and container is not established until the two components are completely and adequately connected together. In one embodiment, the fuel cartridge is brought into direct contact with the fuel chamber. In another embodiment, the fuel cartridge and fuel chamber are brought into contact using a manifold system or an adapter. When an adapter is used, the fuel cartridge is connected to an input of the adapter and the fuel chamber is connected to an output of the adapter.

Once the fuel supply is brought into contact with the fuel cartridge or fuel chamber, the desired amount of fuel is transferred from the fuel supply to the receiving fuel cartridge or fuel chamber. In order to control the amount of fuel transferred to the fuel chamber, the level of fuel in the receiving fuel cartridge chamber is monitored. When the fuel level in the fuel cartridge or chamber reaches a predetermined value, the transfer of fuel is stopped. Typically, the transfer of fuel is stopped when the fuel level reaches about 85% to about 95% of the capacity of the fuel chamber. Monitoring of the fuel level and halting the fuel transfer can be accomplished manually or automatically. Once the chamber has been re-filled to the desired level, the fuel supply and the fuel chamber are disconnected. The connection points are then sealed to prevent leakage. This sealing may take place automatically or manually. The connections points may also be retracted into the cartridge or the electronic device containing the fuel chamber to prevent damage to the connectors.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An adapter for connecting a first fuel supply, having a first outlet, to a second fuel supply, having a second inlet, comprising:
- an input connector, capable of connecting the adapter to the first outlet of the first fuel supply; and
- an output connector, capable of connecting the adapter to the second inlet of the second fuel supply;
- wherein the adapter is arranged to transfer fuel from the first fuel supply to the second fuel supply, wherein the adapter is a separate device from the first fuel supply and the second fuel supply such that the adapter is readily removable from said first and second fuel supplies; and
- wherein the first outlet of the first fuel supply comprises a first half of a two-component valve and the input connector comprises a second half of the two-component valve.

2. An adapter for connecting a first fuel supply, having a first outlet, to a second fuel supply, having a second inlet, comprising:
- an input connector, capable of connecting the adapter to the first outlet of the first fuel supply; and
- an output connector, capable of connecting the adapter to the second inlet of the second fuel supply;
- wherein the adapter is arranged to transfer fuel from the first fuel supply to the second fuel supply, wherein the adapter is a separate device from the first fuel supply and the second fuel supply such that the adapter is readily removable from said first and second fuel supplies; and
- wherein the second fuel supply is disposed in an electronic device and the adapter transfers fuel to the second fuel supply in-situ.

3. The adapter of claim 2, wherein the second inlet comprises a retractable valve connector connectable to the output connector on the adapter.

4. The adapter of claim 1 further comprising a display.

5. The adapter of claim 4, wherein the display comprises a light emitting diode or a liquid crystal display.

6. The adapter of claim 1, wherein the adapter comprises a logic control unit controlling the operation of the adapter.

7. The adapter of claim 2 further comprising at least one valve arranged to selectively stop the flow of fuel from the first fuel supply to the second fuel supply.

8. The adapter of claim 2, wherein the first outlet of the first fuel supply comprises a first half of a two-component valve and the input connector comprises a second half of the two-component valve.

9. The adapter of claim 2 further comprising a display.

10. The adapter of claim 9, wherein the display comprises a light emitting diode or a liquid crystal display.

11. The adapter of claim 2, wherein the adapter comprises a logic control unit controlling the operation of the adapter.

* * * * *